(12) United States Patent
Kalyanasundharam et al.

(10) Patent No.: US 10,042,576 B2
(45) Date of Patent: Aug. 7, 2018

(54) METHOD AND APPARATUS FOR COMPRESSING ADDRESSES

(71) Applicant: Advanced Micro Devices, Inc., Sunnyvale, CA (US)

(72) Inventors: Vydhyanathan Kalyanasundharam, Sunnyvale, CA (US); Greggory D. Donley, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 92 days.

(21) Appl. No.: 15/345,639

(22) Filed: Nov. 8, 2016

(65) Prior Publication Data

US 2018/0052631 A1 Feb. 22, 2018

Related U.S. Application Data

(60) Provisional application No. 62/376,096, filed on Aug. 17, 2016.

(51) Int. Cl.
*G06F 12/00* (2006.01)
*G06F 3/06* (2006.01)
*G06F 12/0895* (2016.01)

(52) U.S. Cl.
CPC ............ *G06F 3/0638* (2013.01); *G06F 3/061* (2013.01); *G06F 3/0647* (2013.01); *G06F 3/0683* (2013.01); *G06F 12/0895* (2013.01); *G06F 2212/60* (2013.01)

(58) Field of Classification Search
None
See application file for complete search history.

(56) References Cited

U.S. PATENT DOCUMENTS

| | | |
|---|---|---|
| 6,477,613 B1 | 11/2002 | Arimilli et al. |
| 2003/0217237 A1 | 11/2003 | Benveniste et al. |
| 2013/0262538 A1 | 10/2013 | Wegener |
| 2015/0363314 A1 | 12/2015 | Chung |

FOREIGN PATENT DOCUMENTS

WO 2009006113 A2 1/2009

*Primary Examiner* — John A Lane
(74) *Attorney, Agent, or Firm* — Volpe and Koenig, P.C.

(57) ABSTRACT

A method and apparatus of compressing addresses for transmission includes receiving a transaction at a first device from a source that includes a memory address request for a memory location on a second device. It is determined if a first part of the memory address is stored in a cache located on the first device. If the first part of the memory address is not stored in the cache, the first part of the memory address is stored in the cache and the entire memory address and information relating to the storage of the first part is transmitted to the second device. If the first part of the memory address is stored in the cache, only a second part of the memory address and an identifier that indicates a way in which the first part of the address is stored in the cache is transmitted to the second device.

44 Claims, 4 Drawing Sheets

METHOD AND APPARATUS FOR COMPRESSING ADDRESSES

CROSS REFERENCE TO RELATED APPLICATIONS

This Application claims the benefit of U.S. Provisional Application Ser. No. 62/376,096, filed Aug. 17, 2016, the contents of which are incorporated herein by reference as if fully set forth.

BACKGROUND

Links between chips (e.g., processors) transmit control information and data over the same set of wires. On a global memory interconnect (GMI) link, for example, each link packet transmitted is 128 B wide. A typical request transmission over a link includes a "request" command, "response" command, and an "acknowledgment" (ACK) command, to complete a transaction. These three commands are control packets and are considered overhead. A typical cache line in a system is 64 B. Therefore, in order to transmit 64 B of data over the link, it takes 4 link packets and another 3 link packets to transmit the command packets.

BRIEF DESCRIPTION OF THE DRAWINGS

A more detailed understanding can be had from the following description, given by way of example in conjunction with the accompanying drawings.

DETAILED DESCRIPTION

Link bandwidth between processor dies is a premium resource due to lower available bandwidth and overhead to transmit control information and data over the same set of wires. In order to conserve link (e.g., GMI/GOP/HT/PCIe) bandwidth, address streams which present a high degree of locality can be compressed. Although the method is described in more detail herein, a sending link controller (e.g., link interface module) maintains the last highest address bits that were transmitted per request stream, which in the context described herein refers to a particular processor (e.g., central processing unit (CPU)), thread, or an input/output (I/O) stream. When the upper bits of a subsequent request address match the saved upper bits of the last request from that same stream, the request packet is marked as being address compressed and the upper bits are not included in the packed GMI packet. In response to receipt of an address compressed request, the receiving link controller then regenerates the complete request address by retrieving a locally maintained copy of the upper address bits for the last request of the same stream.

For example, a method for compressing addresses is disclosed herein. The method includes receiving a transaction at a first device from a source that includes a memory address request for a memory location on a second device, wherein the memory address includes a first part and a second part. It is determined if the first part of the memory address is stored in a cache located on the first device. If the first part of the memory address is not stored in the cache located on the first device, the first part of the memory address is stored in the cache of the first device and the entire uncompressed memory address and information relating to the storage of the first part is transmitted to the second device. If the first part of the memory address is stored in the cache located on the first device, a compressed memory address that includes only the second part of the memory address and an identifier that indicates a way in which the first part of the address is stored in the cache of the first device is transmitted to the second device.

Figure 1:
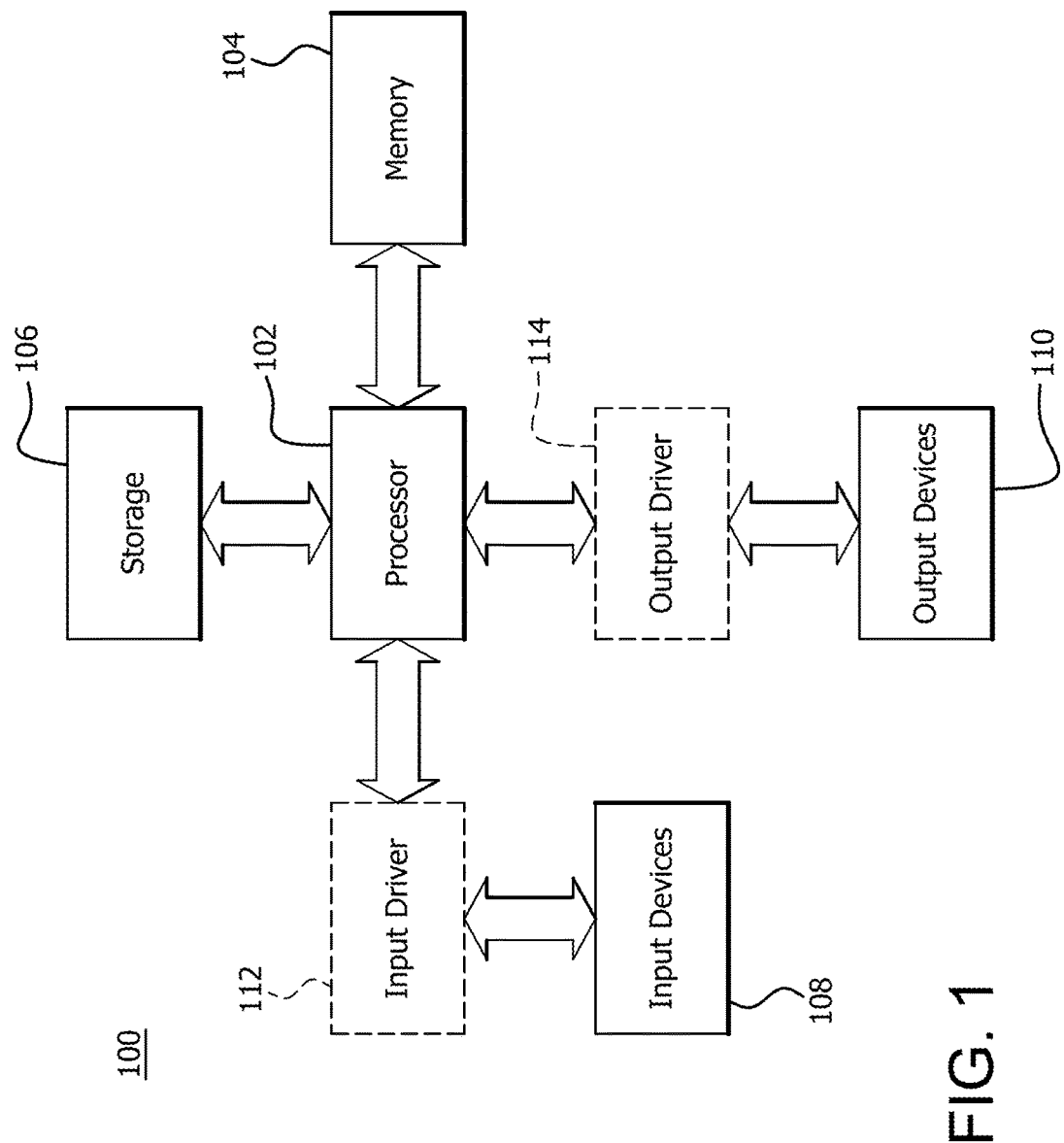
FIG. 1 is a block diagram of an example device in which one or more disclosed examples can be implemented.

FIG. 1 is a block diagram of an example device 100 in which one or more disclosed embodiments can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114.

The processor 102 can include a central processing unit (CPU), a graphics processing unit (GPU), a CPU and GPU located on the same die, or one or more processor cores, wherein each processor core can be a CPU or a GPU. The memory 104 can be located on the same die as the processor 102, or can be located separately from the processor 102. The memory 104 can include a volatile or non-volatile memory, for example, random access memory (RAM), dynamic RAM (DRAM), or a cache.

The storage 106 can include a fixed or removable storage, for example, a hard disk drive, a solid state drive, an optical disk, or a flash drive. The input devices 108 can include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 can include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
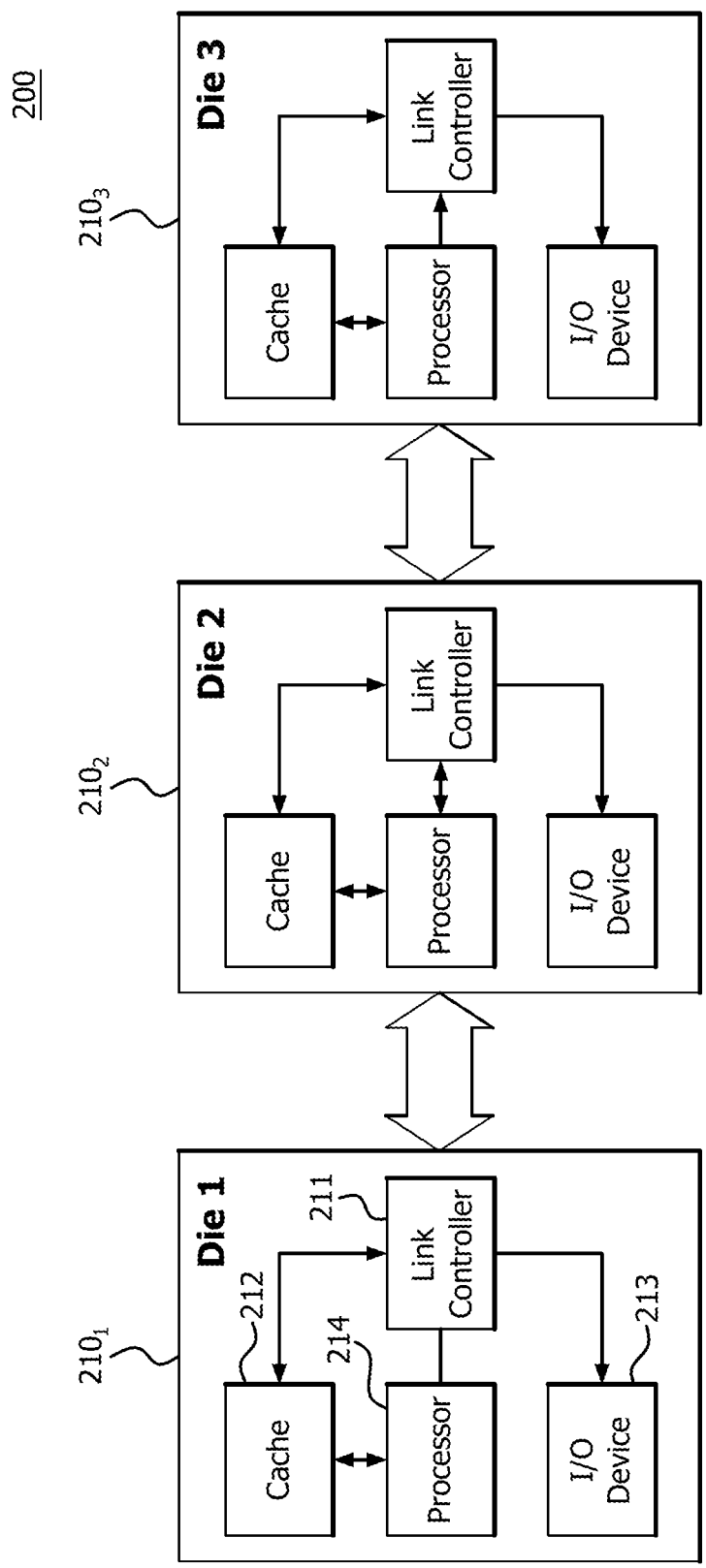
FIG. 2 is a block diagram of an example multiple die system.

FIG. 2 is a block diagram of an example of multiple die apparatus 200. The die apparatus 200 includes one or more dies 210 (designated Die 1 $210_1$, Die 2 $210_2$, and Die 3 $210_3$, for example). Each die 210 includes a link controller 211, a link address cache 212, an I/O device 213, and a processor 214. The cache 212 can be substantially similar to the memory 104 described above in FIG. 1. The I/O device can include elements 108, 110, 112, and 114 of FIG. 1 described above, and the processor 214 can be substantially similar to processor 102 described above in FIG. 1. The link controller 211 controls the communication between dies 210. For example, as shown in FIG. 2, Die 2 $210_2$ is in communication with Die 1 $210_1$ and Die 3 $210_3$. Accordingly, the link controllers 211 for each pair of respective dies 210 controls the communication link between those two dies. The link controller 211 in each die 210 communicates with the cache 212, I/O device 213, and processor 214 within the same die 210 to aid in performing the method described below for compressing addresses.

Figure 3:
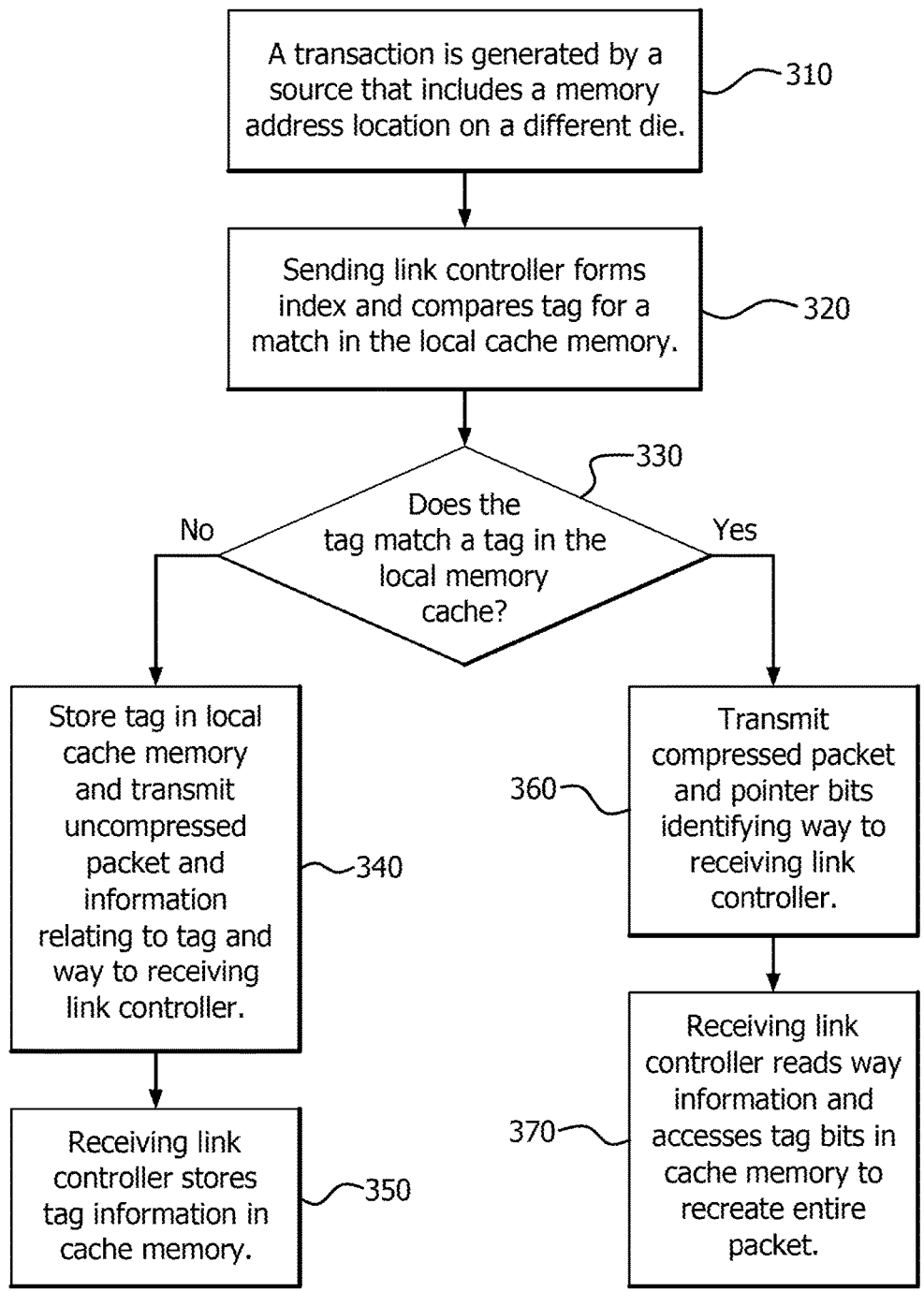
FIG. 3 is a flow diagram of an example method for compressing addresses.

FIG. 3 is a flow diagram of an example method 300 for compressing addresses. In step 310, a transaction is generated by a source, where the transaction includes a memory address location that is stored on a different die 210 than the source generating the transaction. For example, referring back to FIG. 2, a thread running on processor 214 of Die 1 $210_1$ generates a transaction that includes a memory address that is located in the memory on Die 2 $210_2$. That is, a thread running on processor 214 of Die 1 $210_1$ generates a read or write to a DRAM located on Die 2 $210_2$, or during execution requires a code fetch to an address located on Die 2 $210_2$. Alternatively, the I/O device 213 of Die 1 $210_1$ generates an address relating to an input/output transaction (e.g., a read or write) that is located on Die 2 $210_2$. It can also be the case that the address is located on Die 3 $210_3$, or any other additional dies that exist.

Once the transaction is generated (e.g., by a source on Die 1 $210_1$) the link controller 211 of Die 1 $210_1$ forms an index and compares a tag portion for a match in the local cache 212 (step 320). The tag portion refers to the upper bits of the memory address in the generated transaction and is 28 bits wide for example, in a memory address that is 128 bits wide uncompressed.

The index is formed based on information that uniquely identifies each stream, for example. This includes information identifying which CPU, core, thread, or I/O device generated the address. In addition, some combination of address bits, virtual channel indicators, read/write indicators, or other information can be used to map transactions from a particular source (e.g., thread or I/O stream) to a particular index in the cache. Accordingly, each stream maps to a specific index such that unrelated streams are not continually replacing addresses in the cache and lowering efficiency.

Sometimes, the same device, such as the CPU, or a device generating a thread for example, generates multiple address streams. The transactions generated can include interleaved transactions reading memory via one or more streams of addresses, writing to one or more different areas of memory via a different stream of addresses, and fetching code using yet another stream of addresses. The number of streams utilized by a process generating the streams has no hard limit.

Therefore, each cache index contains multiple ways of associativity (e.g., 4 in this case) which allows the cache to contain the last 4 different address streams (i.e., upper bits). I/O devices can have even more address streams interleaved. Accordingly multiple indexes are assigned per I/O source in order to distribute address streams across more indexes to avoid useful addresses being overwritten prematurely. In this case, some number of address bits are used to map associated addresses to different entries. Also, reads and writes are mapped to different entries since reads and writes are independent address streams. Note that the receiving link controller needs to have the same information available and use the same algorithm to generate the cache index for a particular transaction so that it can find the entry to store new addresses into, or from which to read an address from when uncompressing a packet. In step 330 it is determined whether the tag matches a tag stored in the local cache. For example, link controller 211 of Die 1 $210_1$ checks to see if the tag matches a tag stored in cache memory 212 of Die 1 $210_1$. If there is no match in step 330, then the tag is stored in a specific way of the local cache memory and an uncompressed packet, including the whole address and information relating which way should be used, is transmitted to a receiving link controller (step 340).

Accordingly, the address information is stored in a particular way of the cache, which is indicated by the sender. For example, any way that does not contain an address (e.g., is not marked 'valid') is selected. If all of the ways are valid, then one is selected (e.g., randomly). In an alternative example, which entry was used least recently (either allocated, or used to compress a packet) is tracked, and replaced. For example, if link controller 211 of Die 1 $210_1$ receives a transaction that includes an address whose tag does not match one that is stored in cache memory 212 of Die 1 $210_1$ (i.e., the local cache memory of Die 1 $210_1$), then the link controller 211 of Die 1 $210_1$ stores an index that indicates the tag and the way it is stored in a table in cache memory 212 of Die 1 $210_1$. The way indicates the manner ("way"), in which the tag is stored and can indicate the type of transaction from the source generated the address (e.g., an instruction fetch from a processor, a read, or a write request).

Figure 4:
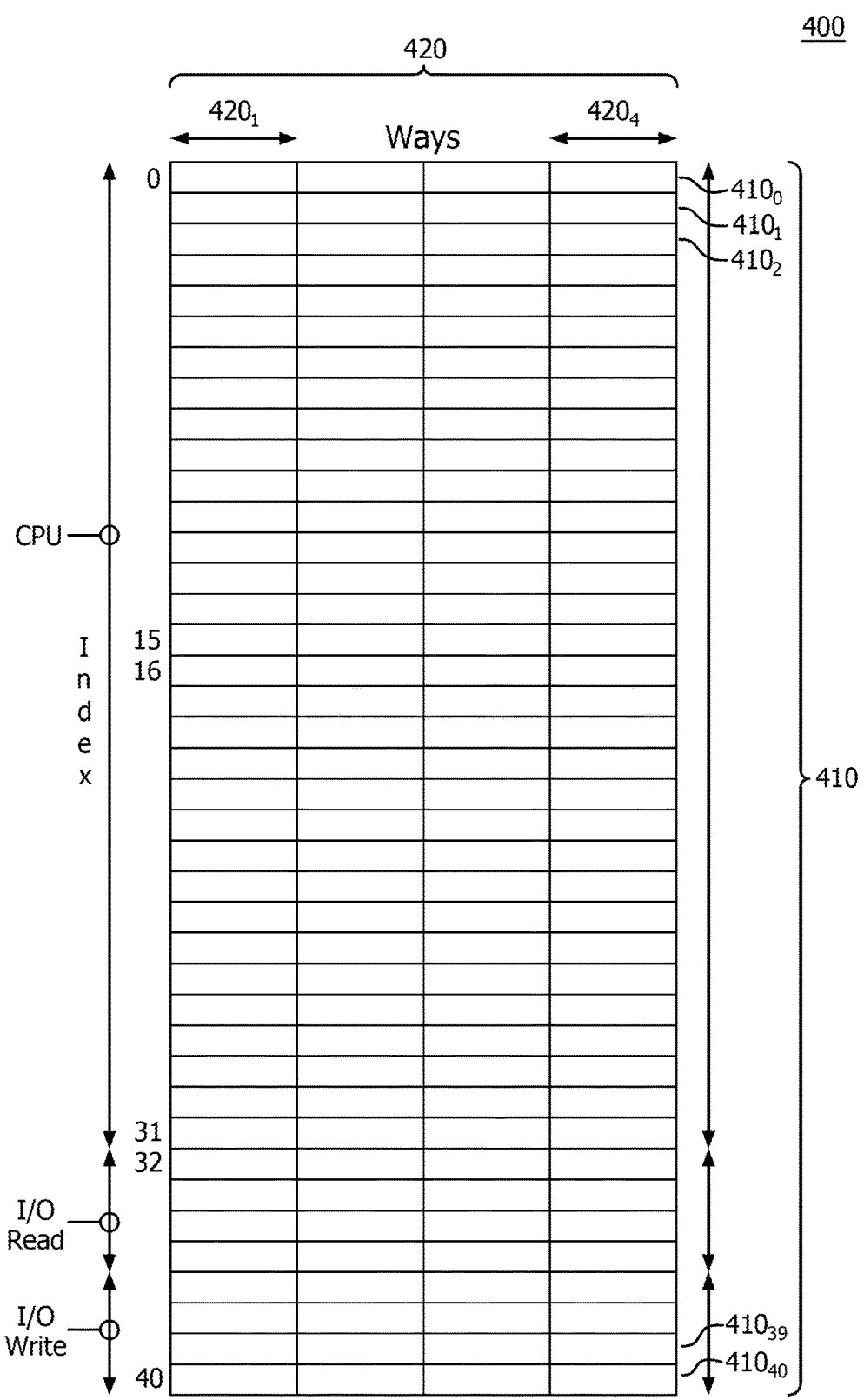
FIG. 4 is an example table of indices and ways.

FIG. 4 is an example table 400 of indices and ways that can be stored in a cache memory. Table 400 includes a plurality of indices 410 (designated $410_0$, $410_1$, $410_2$, ..., $410_{39}$, and $410_{40}$) that correspond to rows 0-40. Although 40 indices are depicted, the table can include more or less as desired. Additionally, there are four ways 420 (designated $420_1$, ..., $420_4$) indicated in table 400. Again, it should be noted that more or less ways can be stored as desired. Table 400 can also be further segregated depending on the source of the transaction. For example, as shown in FIG. 4, rows 0-31 correspond to CPU transactions generated by threads running on a CPU. Rows 32-35 correspond to I/O read transactions, while rows 36-40 correspond to I/O write transactions. A tag is stored in a cell corresponding to an index row (i.e., 410) and way column (i.e., 420).

Accordingly, referring back to step 340, if link controller 211 of Die 1 $210_1$ does not find a match for the tag in the local memory in step 330, it forms an index and stores the tag in a way in table 400. For example, if the transaction was received from a thread running on processor 214, the tag can be stored in index 0, way 0 (i.e., row $410_0$, column $420_1$). It should be noted that if the cache memory is full, an index will first need to be deleted before storing a new index. Accordingly, if the case exists that table 400 is full, then the link controller 211 of Die 1 $210_1$ selects an index to remove and stores a newly generated address tag and way in that index row. For example, any way within an index that is to be replaced is selected, but each index is tied to a specific source via an index generation algorithm, such that a particular transaction maps to one index and only that index can be accessed by any transaction that was mapped to it.

Alternatively, the sending link controller tracks the indices that are associated with a particular source of the transaction and deletes an index that is stored for that source. For example, if a transaction is received from processor thread "5", the link controller on Die 1 $210_1$ examines which indices are associated with thread 5, deletes one of those indices, and stores the new index formed for the new transaction. As another alternative, the least recently used address is identified and that index is deleted.

Once the tag is stored, link controller 211 of Die 1 $210_1$ transmits the uncompressed packet, including the entire address and information relating to the way stored, to the link controller of Die 2 $210_2$. The information that relates to the tag and way stored is in the form of two bits that are added to the header of the packet, for example, that identify the way. That is, 1 bit is sent to indicate the address cache should allocate the current address and 2 bits indicating which of the 4 ways associated with the single index to which the current transaction maps should be written. The index is derived from the contents of the uncompressed transaction. In order to avoid conflicts, the sending link controller on Die 1 210$_1$ transmits all transactions accessing the same index, in the same order that is updated/matched on its cache before transmitting the current transaction address to the link controller on Die 2 210$_2$. Otherwise, if the same index is modified by a subsequent transaction before the first transaction associated with that index is processed, the receiving link controller will not store or look in the correct location for the tag and way that relates to the first transaction sent.

In step 350, the receiving link controller (i.e., the link controller on Die 2 210$_2$) receives the entire address for processing as well as the information relating to the way stored, and stores the tag in a corresponding table 400 in the cache memory located on Die 2 210$_2$.

Referring back now to step 330, where the tag matches a tag and way in the local cache memory, the link controller of Die 1 210$_1$ transmits a compressed packet and pointer bits that identify the way the tag is stored to the receiving link controller on Die 2 210$_2$ (step 360). For example, the link controller 211 of Die 1 210$_1$ receives a transaction that includes an address having a tag that matches one stored in table 400 of the cache memory 212 of Die 1 210$_1$.

In this example case, link controller 211 of Die 1 210$_1$ removes the upper bits (i.e., the tag) from the address and transmits only the lower bit portion of the address to the receiving link controller on Die 2 210$_2$, as well as a two-bit pointer indicating the way in which the tag is stored in table 400. The receiving link controller (i.e., the link controller of Die 2 210$_2$ in this example) reads the way information and accesses the tag bits from its table 400 in the cache memory of Die 2 210$_2$ to recreate the entire uncompressed packet for processing (step 370).

The methods provided can be implemented in a general purpose computer, a processor, or a processor core. Suitable processors include, by way of example, a general purpose processor, a special purpose processor, a conventional processor, a digital signal processor (DSP), a plurality of microprocessors, graphics processor, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Also, although the methods or flowcharts described above are described with respect to communication between two dies (e.g., Die 1 210$_1$ and Die 2 210$_2$), the communications can also occur between any dies.

An apparatus is disclosed herein. The apparatus includes a first link controller and a first cache operatively connected to the first link controller. The first link controller receives a transaction from a source that includes a memory address request for a memory location on a second apparatus, wherein the memory address includes a first part and a second part. The first link controller determines if the first part of the memory address is stored in the first cache. If the first part of the memory address is not stored in the first cache, the first link controller stores the first part of the memory address in the first cache and transmits, to the second apparatus, the entire uncompressed memory address and information relating to the storage of the first part. If the first part of the memory address is stored in the first cache, the first link controller transmits, to the second apparatus, a compressed memory address that includes only the second part of the memory address and an identifier that indicates a way in which the first part of the memory address is stored in the first cache.

A non-transitory computer-readable medium having instructions recorded thereon, that when executed by a computing device, cause the computing device to perform operations is disclosed herein. The operations include receiving a transaction at a first device from a source that includes a memory address request for a memory location on a second device, wherein the memory address includes a first part and a second part. It is determined if the first part of the memory address is stored in a cache located on the first device. If the first part of the memory address is not stored in the cache located on the first device, the first part of the memory address is stored in the cache of the first device and the entire uncompressed memory address and information relating to the storage of the first part is transmitted to the second device. If the first part of the memory address is stored in the cache located on the first device, a compressed memory address that includes only the second part of the memory address and an identifier that indicates a way in which the first part of the memory address is stored in the cache of the first device is transmitted to the second device.

A system is disclosed herein. The system includes a first device, including a first link controller, a first cache, a first processor, and a first input/output (I/O) device; and a second device, including a second link controller, a second cache, a second processor, and a second I/O device. The first link controller receives a transaction from the first processor or the first I/O device that includes a memory address request for a memory location on the second device, wherein the memory address includes a first part and a second part. The first link controller determines if the first part of the memory address is stored in the first cache. If the first part of the memory address is not stored in the first cache, the first link controller stores the first part of the memory address in the first cache and transmits, to the second device, the entire uncompressed memory address and information relating to the storage of the first part. If the first part of the memory address is stored in the first cache, the first link controller transmits, to the second device, a compressed memory address that includes only the second part of the memory address and an identifier that indicates a way in which the first part of the memory address is stored in the first cache. The second link controller, upon receiving the information relating to the storage of the first part, stores the information relating to the storage of the first part in the second cache.

Upon receiving the compressed memory address and identifier that indicates a way in which the first part of the memory address is stored in the first cache, the second link controller retrieves the first part of the memory address from the second cache located on the second device based upon the identifier, and reassembles the entire uncompressed memory address.

In some examples, the second device, upon receiving the information relating to the storage of the first part, stores the information relating to the storage of the first part in a cache located on the second device. In some examples the second device, upon receiving the compressed memory address and identifier that indicates a way in which the first part of the address is stored in the cache of the first device, retrieves the first part of the memory address from the cache located on the second device based upon the identifier, and reassembles the entire uncompressed memory address. In some examples, the reassembling includes attaching the first part to the second part.

In some examples, the first part is a tag that includes upper bits of the uncompressed memory address. In some examples, the tag is stored in a location in a table in the cache located on the first device, the location associated with the source that generated the transaction. In some examples, the tag is stored in the table associated with a way in which the tag is stored. In some examples, the tag is stored in a row in the table identified with a table index where the tag is stored and is also stored in a column corresponding to the row that is associated with the way the tag is stored. In some examples, one or more index rows are associated with a particular source.

In some examples, the source includes a processor or an input/output (I/O) device of the first device. In some examples, an index row is associated with a plurality of way columns. In some examples, the transaction type includes one or more of the following: a program execution thread, a read request, or a write request. In some examples, a particular row index associated with the I/O device is associated with a read request or a write request.

An apparatus is disclosed herein. The apparatus includes a first link controller and a first cache operatively connected to the first link controller. The first link controller receives a transaction from a source that includes a memory address request for a memory location on a second apparatus, wherein the memory address includes a first part and a second part. The first link controller determines if the first part of the memory address is stored in the first cache. If the first part of the memory address is not stored in the first cache, the first link controller stores the first part of the memory address in the first cache and transmits, to the second apparatus, the entire uncompressed memory address and information relating to the storage of the first part. If the first part of the memory address is stored in the first cache, the first link controller transmits, to the second apparatus, a compressed memory address that includes only the second part of the memory address and an identifier that indicates a way in which the first part of the memory address is stored in the first cache.

What is claimed is:

1. A method of compressing addresses for transmission from a first device to a second device over a link, comprising:
   receiving a transaction at the first device from a source that includes a memory address request for a memory location on the second device, wherein the memory address includes a first part and a second part;
   determining if the first part of the memory address is stored in a cache located on the first device; and
   if the first part of the memory address is not stored in the cache located on the first device, storing the first part of the memory address in the cache of the first device and transmitting, to the second device, the entire memory address and information relating to the storage of the first part, and
   if the first part of the memory address is stored in the cache located on the first device, transmitting, to the second device, only the second part of the memory address and an identifier that indicates a way in which the first part of the memory address is stored in the cache of the first device.

2. The method of claim 1, further comprising the second device, upon receiving the information relating to the storage of the first part, storing the information relating to the storage of the first part in a cache located on the second device.

3. The method of claim 2, further comprising the second device, upon receiving the second part of the memory address and the identifier that indicates the way in which the first part of the memory address is stored in the cache of the first device:
   retrieving the first part of the memory address from the cache located on the second device based upon the identifier; and
   reassembling the entire memory address.

4. The method of claim 3, wherein the reassembling includes attaching the first part to the second part.

5. The method of claim 1, wherein the first part is a tag that includes upper bits of the entire memory address.

6. The method of claim 5, further comprising storing the tag in a location in a table in the cache located on the first device, the location associated with the source that generated the transaction.

7. The method of claim 6, further comprising storing the tag in the table associated with a way in which the tag is stored.

8. The method of claim 7, wherein the tag is stored in a row in the table, the row identified with an index indicating where the tag is stored in the table, and wherein the tag is stored in a column that is associated with the way where the tag is stored.

9. The method of claim 8, wherein one or more index rows are associated with a particular source.

10. The method of claim 9, wherein the source includes any one of the following: a processor or an input/output (I/O) device of the first device.

11. The method of claim 10, wherein an index row is associated with a plurality of way columns.

12. The method of claim 11, wherein a transaction type includes one or more of the following: a program execution thread, a read request, or a write request.

13. The method of claim 10, wherein a particular row index associated with the I/O device is associated with one or more of the following transactions: a read request or a write request.

14. An apparatus, comprising:
   a first link controller; and
   a first cache operatively connected to the first link controller, wherein
   the first link controller:
      receives a transaction from a source that includes a memory address request for a memory location on a second apparatus, and wherein the memory address includes a first part and a second part, determines if the first part of the memory address is stored in the first cache, and if the first part of the memory address is not stored in the first cache, stores the first part of the memory address in the first cache and transmits, to the second apparatus, the entire memory address and information relating to the storage of the first part, and if the first part of the memory address is stored in the first cache, transmits, to the second apparatus, only the second part of the memory address and an identifier that indicates a way in which the first part of the memory address is stored in the first cache.

15. The apparatus of claim 14 wherein the first part is a tag that includes upper bits of the entire memory address.

16. The apparatus of claim 15, further comprising storing the tag in a location in a table in the first cache, the location associated with the source that generated the transaction.

17. The apparatus of claim 16, further comprising storing the tag in the table associated with a way in which the tag is stored.

18. The apparatus of claim 17, wherein the tag is stored in a row in the table, the row identified with an index indicating where the tag is stored in the table, and wherein the tag is stored in a column associated with a way where the tag is stored.

19. The apparatus of claim 18, wherein one or more index rows are associated with a particular source.

20. The apparatus of claim 19 wherein an index row is associated with a plurality of way columns.

21. The apparatus of claim 14, further comprising a processor.

22. The apparatus of claim 21, wherein the processor is the source that generated the transaction.

23. The apparatus of claim 22, wherein a transaction type includes one or more of the following: a program execution thread, a read request, or a write request.

24. The apparatus of claim 14, further comprising an input/output (I/O) device.

25. The apparatus of claim 24, wherein the I/O device is the source that generated the transaction.

26. The apparatus of claim 25, wherein a particular row index associated with the I/O device is associated with one or more of the following transactions: a read request or a write request.

27. The apparatus of claim 14, wherein upon receiving information relating to a storage of a first part of a memory address by the first link controller from the second apparatus, the first link controller stores the information relating to the storage of the first part in the first cache.

28. The apparatus of claim 27, wherein the first link controller, upon receiving the second part of the memory address and the identifier that indicates the way in which the first part of the memory address is stored in a cache of the second apparatus:

retrieves the first part of the memory address from the first cache located based upon the identifier; and reassembles the entire memory address.

29. The apparatus of claim 28, wherein the reassembling includes attaching the first part to the second part.

30. A non-transitory computer-readable medium having instructions recorded thereon, that when executed by a computing device, cause the computing device to perform operations including:

receiving a transaction at the computing device from a source that includes a memory address request for a memory location on a second device, wherein the memory address includes a first part and a second part;

determining if the first part of the memory address is stored in a cache located on the first device; and if the first part of the memory address is not stored in the cache located on the computing device, storing the first part of the memory address in the cache of the computing device and transmitting, to the second device, the entire memory address and information relating to the storage of the first part, and if the first part of the memory address is stored in the cache located on the computing device, transmitting, to the second device, only the second part of the memory address and an identifier that indicates a way in which the first part of the memory address is stored in the cache of the computing device.

31. The non-transitory computer-readable medium of claim 30, further comprising the second device, upon receiving the information relating to the storage of the first part, storing the information relating to the storage of the first part in a cache located on the second device.

32. The non-transitory computer-readable medium of claim 31, further comprising the second device, upon receiving the second part of the memory address and the identifier that indicates a way in which the first part of the memory address is stored in the cache of the computing device:

retrieving the first part of the memory address from the cache located on the second device based upon the identifier; and reassembling the entire memory address.

33. The non-transitory computer-readable medium of claim 32, wherein the reassembling includes attaching the first part to the second part.

34. The non-transitory computer-readable medium of claim 30, wherein the first part is a tag that includes upper bits of the entire memory address.

35. The non-transitory computer-readable medium of claim 34, further comprising storing the tag in a location in a table in the cache located on the computing device, the location associated with the source that generated the transaction.

36. The non-transitory computer-readable medium of claim 35, further comprising storing the tag in the table associated with a way in which the tag is stored.

37. The non-transitory computer-readable medium of claim 36, wherein the tag is stored in a row in the table, the row identified with an index indicating where the tag is stored in the table, and wherein the tag is stored in a column that is associated with the way where the tag is stored.

38. The non-transitory computer-readable medium of claim 37, wherein one or more index rows are associated with a particular source.

39. The non-transitory computer-readable medium of claim 38, wherein the source includes any one of the following: a processor or an input/output (I/O) device of the first device.

40. The non-transitory computer-readable medium of claim 39, wherein an index row is associated with a plurality of way columns.

41. The non-transitory computer-readable medium of claim 40, wherein a transaction type includes one or more of the following: a program execution thread, a read request, or a write request.

42. The non-transitory computer-readable medium of claim 39, wherein a particular row index associated with the I/O device is associated with one or more of the following transactions: a read request or a write request.

43. A system, comprising:
a first device, including a first link controller, a first cache, a first processor, and a first input/output (I/O) device; and
a second device, including a second link controller, a second cache, a second processor, and a second I/O device, wherein
the first link controller:
   receives a transaction from the first processor or the first I/O device that includes a memory address request for a memory location on the second device, and wherein the memory address includes a first part and a second part,
   determines if the first part of the memory address is stored in the first cache, and
   if the first part of the memory address is not stored in the first cache, stores the first part of the memory address in the first cache and transmits, to the second device, the entire memory address and information relating to the storage of the first part, and
   if the first part of the memory address is stored in the first cache, transmits, to the second device, only the second part of the memory address and an identifier that indicates a way in which the first part of the memory address is stored in the first cache, and
wherein the second link controller:
   upon receiving the information relating to the storage of the first part, stores the information relating to the storage of the first part in the second cache, or
   upon receiving the second part of the memory address and the identifier that indicates the way in which the first part of the address is stored in the first cache:
     retrieves the first part of the memory address from the second cache located on the second device based upon the identifier; and
     reassembles the entire memory address.

44. The system of claim 43, wherein the reassembling includes attaching the first part to the second part.

\* \* \* \* \*